US012806919B2

(12) United States Patent
Park

(10) Patent No.: US 12,806,919 B2
(45) Date of Patent: Nov. 24, 2026

(54) THERMAL TRANSFER PRINTING DEVICE WITH DECAL FUNCTION

(71) Applicant: DS GLOBAL, Seoul (KR)

(72) Inventor: Kyoung Tae Park, Seoul (KR)

(73) Assignee: DS GLOBAL, Seoul (KR)

( * ) Notice: Subject to any disclaimer, the term of this patent is extended or adjusted under 35 U.S.C. 154(b) by 207 days.

(21) Appl. No.: 18/713,753

(22) PCT Filed: Sep. 21, 2022

(86) PCT No.: PCT/KR2022/014061
§ 371 (c)(1),
(2) Date: May 28, 2024

(87) PCT Pub. No.: WO2023/101164
PCT Pub. Date: Jun. 8, 2023

(65) Prior Publication Data

US 2025/0100301 A1 Mar. 27, 2025

(30) Foreign Application Priority Data

Nov. 30, 2021 (KR) ........................ 10-2021-0168985

(51) Int. Cl.

| | |
|---|---|
| ***B41J 2/325*** | (2006.01) |
| ***B41J 2/32*** | (2006.01) |
| ***B41J 11/00*** | (2006.01) |
| ***B41J 11/04*** | (2006.01) |
| ***B41J 11/66*** | (2006.01) |
| ***B41J 11/70*** | (2006.01) |
| ***B41J 13/00*** | (2006.01) |

(52) U.S. Cl.
CPC ................. *B41J 2/325* (2013.01); *B41J 2/32* (2013.01); *B41J 11/00* (2013.01); *B41J 11/0005* (2013.01); *B41J 11/04* (2013.01); *B41J 11/66* (2013.01); *B41J 11/70* (2013.01); *B41J 13/009* (2013.01)

(58) Field of Classification Search
CPC . B41J 2/32; B41J 11/00; B41J 11/0005; B41J 11/04; B41J 11/66; B41J 11/70; B41J 13/009
See application file for complete search history.

(56) References Cited

U.S. PATENT DOCUMENTS

2014/0055548 A1* 2/2014 Mindler .................. B41J 2/325 347/217

FOREIGN PATENT DOCUMENTS

| | | | |
|---|---|---|---|
| JP | 2009-166254 | A | 7/2009 |
| JP | 2011-068479 | A | 4/2011 |
| JP | 2019-038679 | A | 3/2019 |
| KR | 10-0520578 | B1 | 10/2005 |
| KR | 10-2011-0011796 | A | 2/2011 |

* cited by examiner

*Primary Examiner* — Geoffrey S Mruk
(74) *Attorney, Agent, or Firm* — NKL LAW; Jae Youn Kim

(57) ABSTRACT

The present invention relates to a thermal transfer printing device with a de-curling function and, more particularly, to a thermal transfer printing device with a de-curling function, the device applying heat to an ink ribbon so as to print on roll-type printing paper, de-curling the printed printing paper, and then directly providing a user with printed material without back-feeding.

5 Claims, 4 Drawing Sheets

THERMAL TRANSFER PRINTING DEVICE WITH DECAL FUNCTION

TECHNICAL FIELD

The present invention relates to a thermal transfer printer with a de-curling function, more specifically to a thermal transfer printer with a de-curling function that is capable of applying heat to an ink ribbon so as to print on roll type printing paper, de-curling the printing paper whose printing is done, and then directly providing the printing paper as a printed material to a user, without having any back-feeding of the printing paper.

BACKGROUND ART

As digital technologies have been recently developed, thermal transfer printers are becoming more and more popular to print the images taken through terminals on the spot or provide various printed materials as a part of terminal application services.

The thermal transfer printer applies heat to an ink ribbon through a thermal print head (TPH) and thus transfers the dye or pigment applied to the ink ribbon to printing paper fed therein.

A method for feeding the printing paper is classified into a method for feeding sheets of paper individually and a method for feeding printing paper by a given length in a state where the printing paper is wound to the form of a roll, and the roll type printing paper is typically wound on a cartridge and mounted in the thermal transfer printer.

After the cartridge has been insertedly mounted in the thermal transfer printer to feed the roll type printing paper, a printing process is performed, and the printing paper whose printing is done is cut by a cutter and then provided to a user through an exit hole.

Further, if the roll type printing paper is wound on the cartridge of the thermal transfer printer, a curl is formed on the printing paper in a winding direction of the printing paper, and therefore, de-curling through which the printing paper passes through a de-curler one or more times is performed, thereby providing the printing paper evenly unrolled.

In conventional practices, however, because of the limitations in the designs and arrangements of the parts mounted in a printer housing, a de-curler and a discharger are located in different directions from each other with respect to a branch point for selecting a printing process.

Therefore, the printing paper is transferred to one side where the de-curler is located so that de-curling for the printing paper is performed at least one or more times, and next, back-feeding for the printing paper has to be performed so that the printing paper is transferred back to the branch point. After that, the printing paper is changed in direction toward the discharger, thereby making it possible to discharge the printing paper whose printing is done.

DISCLOSURE OF THE INVENTION

Technical Problems

Accordingly, the present invention has been made in view of the above-mentioned problems occurring in the related art, and it is an object of the present invention to provide a thermal transfer printer with a de-curling function that is capable of applying heat to an ink ribbon so as to print on roll type printing paper, de-curling the printing paper whose printing is done, and then directly providing the printing paper as a printed material to a user, without having any back-feeding of the printing paper.

Technical Solutions

To accomplish the above-mentioned objects, according to the present invention, there is provided a thermal transfer printer with a de-curling function, including: a paper cartridge for providing roll type printing paper; a paper feed path for providing a path along which the printing paper unwound from the paper cartridge moves during a printing operation; a feed roll for providing a roll type ink ribbon; a winding roll for winding and collecting the ink ribbon used for printing; a ribbon feed path for providing a path along which the ink ribbon unwound from the feed roll moves to the winding roll, the ribbon feed path corresponding to a given area of the paper feed path; a thermal print head located at a specific point where the paper feed path and the ribbon feed path correspond to each other and adapted to apply heat to the ink ribbon to print the printing paper; a platen roller adapted to allow the printing paper and the ink ribbon to come into close with the thermal print head during the printing; a diverter located at a branch point located under the thermal print head with respect to a transfer direction of the printing paper to guide the printing paper to any one of a paper escape path and a paper exit path according to a rotational direction thereof; a de-curler located on at least a given area of the paper exit path and adapted to perform de-curling through which the printing paper is bent to the opposite direction to the curled direction thereof; and a cutter located between the de-curler and an exit hole for discharging the printing paper whose printing has been done to the outside of the printer and adapted to cut the printing paper to a predetermined length, wherein after the de-curling for the printing paper has been completed through the de-curler, the printing paper is directly discharged through the exit hole, without having any back-feeding through which the printing paper passes through the diverter and is changed to the other path.

In this case, the paper cartridge may be located on one side of a printer housing in a transverse direction of the printer housing, the feed roll and the winding roll may be located on the upper and lower portions of the other side of the printer housing in the transverse direction of the printer housing, the thermal print head may be placed between the feed roll and the winding roll that are located on the upper and lower portions of the printer housing, the paper escape path may be provided above the paper cartridge, the paper exit path may be provided above the feed roll, and the branch paths of the paper escape path and the paper exit path may be formed above the diverter.

Further, the diverter may be kept at a slant posture to a given angle if the diverter rotates in a direction blocking the paper escape path, so that the diverter may provide a moving path bent in the opposite direction to the curled direction of the printing paper.

Furthermore, on a given area including an area before the printing paper passes through the diverter and an area after the printing paper has passed through the diverter, a sub de-curler may be located to provide a path along which the printing paper is bent in the opposite direction to the curled direction thereof.

Moreover, the de-curler may include: a de-curling guide for providing a path bent to the opposite direction to the curled direction of the printing paper along the transfer direction of the printing paper; and a de-curling roller located in a space formed inside the de-curling guide, while being spaced apart from the inner wall of the de-curling guide, so that a path may be formed between the de-curling roll and the de-curling guide.

Further, the de-curling guide may include: an entry portion where the printing paper passes through the diverter and thus enters the de-curler; an exit portion where the printing paper is discharged toward the exit hole; and a de-curling portion formed between the entry portion and the exit portion in such a way as to be bent to the opposite direction to the curled direction of the printing paper.

Furthermore, an internal angle between a first tangent line coming into contact with the entry portion and a second tangent line coming into contact with the exit portion may be at an angle of 85 to 95°.

Advantageous Effects of the Invention

According to the present invention, the thermal transfer printer with a de-curling function applies heat to the ink ribbon so as to print on the roll type printing paper and de-curls the printing paper whose printing is done. Further, the thermal transfer printer according to the present invention adopts an efficient de-curling structure where the de-curler is located on a position where the discharger is located, so that the printing paper is provided directly to the user, without having any back-feeding.

BEST MODE FOR INVENTION

Hereinafter, an explanation of a thermal transfer printer with a de-curling function according to an embodiment of the present invention will be given in detail with reference to the attached drawings.

Figure 1:
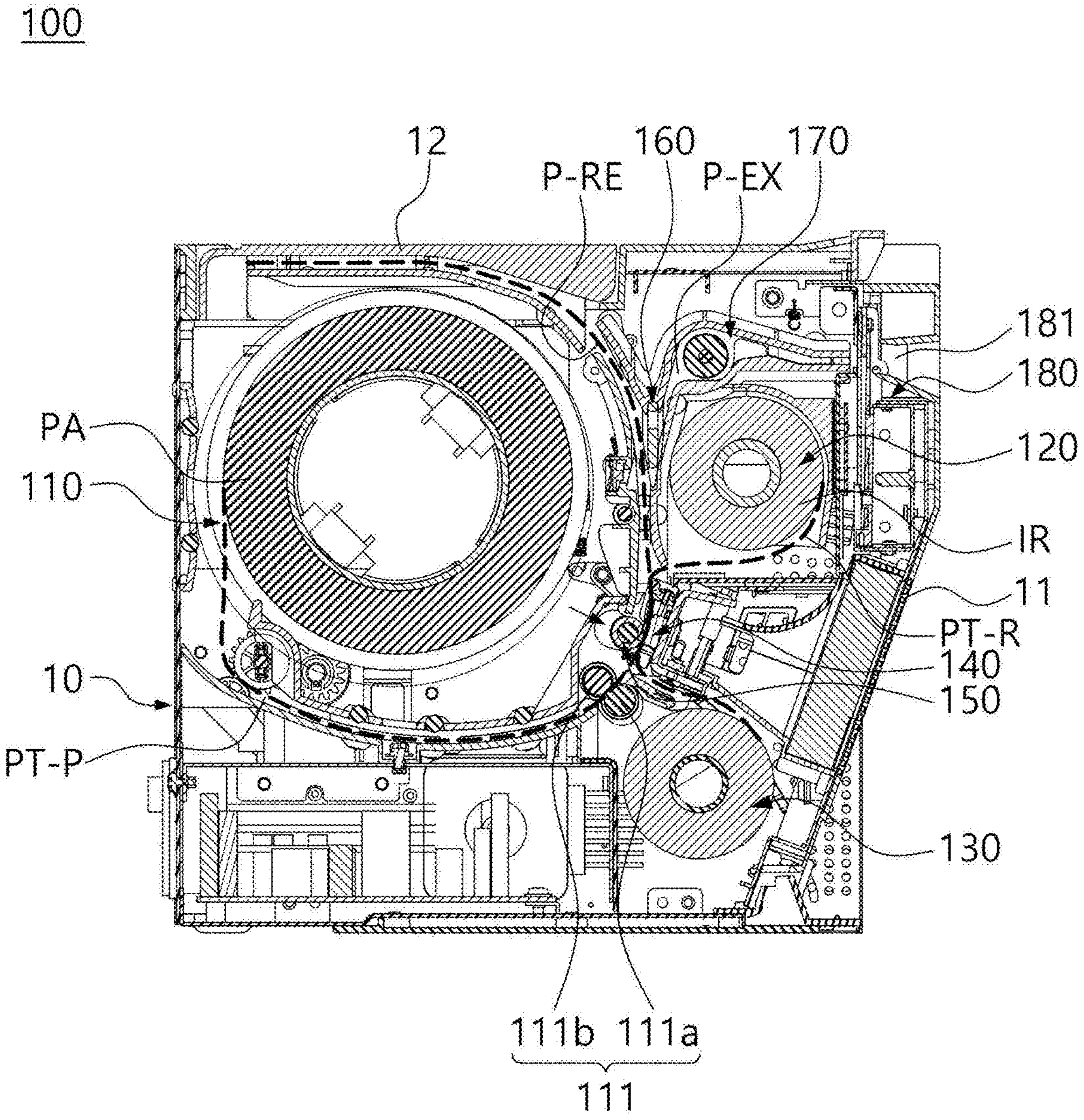
FIG. 1 is a front sectional view showing a printing state of a thermal transfer printer according to the present invention.
Figure 2:
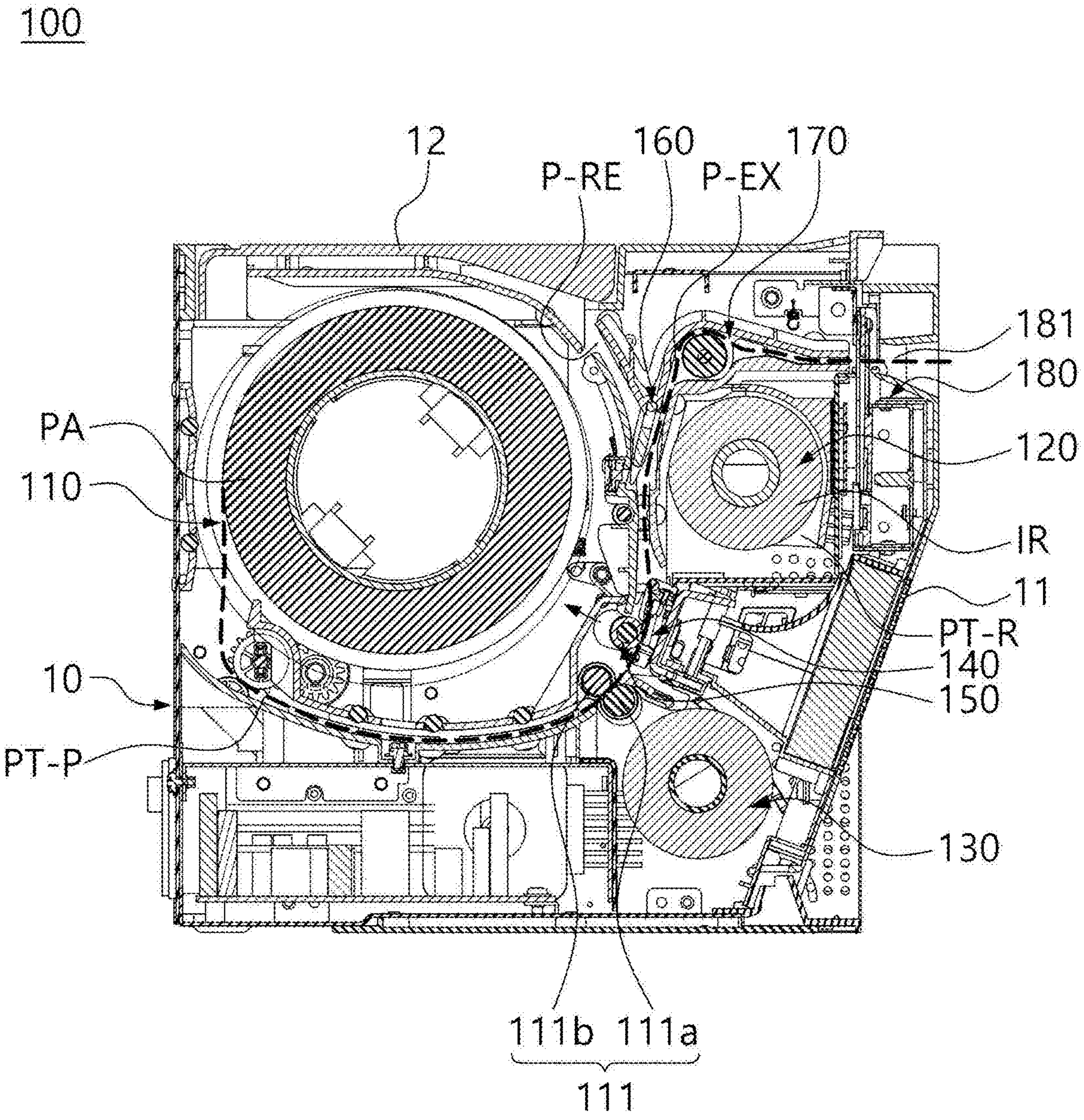
FIG. 2 is a front sectional view showing a de-curling state of the thermal transfer printer according to the present invention.

FIG. 1 is a front sectional view showing a printing (thermal transfer) state of the thermal transfer printer, and FIG. 2 is a front sectional view showing a de-curling (paper discharging) state of the thermal transfer printer.

As shown, the thermal transfer printer 100 according to the present invention applies heat to an ink ribbon IR through a thermal print head 140 to transfer ink such as dye or pigment applied onto the ink ribbon to printing paper PA, thereby performing printing on the printing paper.

The thermal transfer printer 100 is driven by a printer engine having a motor and gears for printing, thereby performing a printing process, and the printing paper and the ink ribbon as consumables are wound on cartridges and then mounted in a printer housing (printer body).

The printing process largely includes the step of transferring the printing paper and the ink ribbon to the thermal print head 140 to perform printing on the printing paper (See FIG. 1) and the step of de-curling the printing paper whose printing has been done and discharging the printing paper to the outside of the printer body (See FIG. 2).

To distinguish a printing path and a de-curling and discharging path from each other, any one of a first path and a second path is open by the rotation of a diverter 160 located on a branch point, and then, the printing paper moves to the open path, so that the corresponding process is performed.

To do this, the thermal transfer printer 100 with a de-curling function according to the present invention includes a paper cartridge 110, a paper feed path PT-P, a feed roll 120, a winding roll 130, a ribbon feed path PT-R, the thermal print head 140, the platen roller 150, the diverter 160, a de-curler 170, and a cutter 180.

According to an embodiment of the present invention, the paper cartridge 110 is located on one side (on the left side of the drawing) of the printer housing 10 (printer body) in a transverse direction of the printer housing 10, and the feed roll 120 and the winding roll 130 are located on the upper and lower portions of the other side (on the right side of the drawing) thereof.

Further, the thermal print head 140 is placed between the feed roll 120 and the winding roll 130 that are located on the upper and lower portions of the printer housing 10, and a paper escape path P-RE and a paper exit path P-EX are branched below the diverter 160.

The paper escape path P-RE is formed above the paper cartridge 110, and the paper exit path P-EX is formed above the feed roll 120 located on the upper side of the printer housing 10. That is, the branch paths of the paper escape path P-RE and the paper exit path P-EX are formed above the diverter 160.

The above-mentioned parts are located in the printer housing 10. The printer housing 10 has the shape of a hexahedral box, and through a front door 11 located on the front surface of the printer housing 10, the feed roll 120 and the winding roll 130 are insertedly mounted in the printer housing 10, and through a top door 12 located on the top surface of the printer housing 10, the paper cartridge 110 is insertedly mounted in the printer housing 10.

Accordingly, the roll type printing paper PA wound on the paper cartridge 110 is fed to the thermal print head 140 through the paper feed path PT-P, and the roll type ink ribbon wound on the feed roll 120 is fed to the thermal print head 140 and then wound on the winding roll 130.

Further, the platen roller 150 allows the printing paper and the ink ribbon that are transferred overlaidly on top of each other to come into close contact with the thermal print head 140, so that printing is performed, and the diverter 160 rotates to left and right sides and thus selects a printing path and a de-curling path after the printing has been done.

After the de-curling has been completed through the de-curler 170, the printing paper is cut to a predetermined length by means of the cutter 180 located below the de-curler 170 along the path in the transfer direction for the de-curling, and the de-curled printing paper is discharged through the discharger 170. According to the present invention, therefore, it is possible that the printed material (the printing paper cut) is discharged, without having any back-feeding.

In more detail, the paper cartridge 110 serves to feed the roll type printing paper, and according to an embodiment of the present invention, the paper cartridge 110 includes a pipe-shaped paper roll and side plates located on both ends of the paper roll.

The printing paper is wound a plurality of times on the paper roll, and next, the paper roll is coupled to the rotating centers of the side plates coupled to both longitudinal ends thereof. As the paper roll rotates by means of the side plates coupled to gears of an engine, therefore, the printing paper is fed.

The paper feed path PT-P is a path along which the printing paper unwound from the paper cartridge 110 moves during a printing operation, and according to an embodiment of the present invention, the paper feed path PT-P is formed by means of guides with wall structures in the interior of the printer housing 10.

That is, the guides, which are spaced apart from each other in two rows, are constantly or intermittently provided along a transfer path of the printing paper, so that the paper feed path PT-P is formed between the guides arranged in two rows. Accordingly, the printing paper unwound from the paper roll is transferred to the thermal print head 140 along the paper feed path PT-P.

According to the present invention, the paper feed path PT-P is defined as a path along which the printing paper is unwound from the paper cartridge 110 and transferred to the thermal print head 140, and the path may be freely changed in length and pattern.

Further, a pair of paper feed rolls 111 in the paper feed path PT-P is located to feed (transfer) the printing paper. For example, the paper feed rolls 111 include a grip roller 111*a* having spike protrusions formed on the surface thereof and a pressurizing roller 111*b* moving to come into contact with the grip roller 111*a*. If the pressurizing roller 11*b* moves to come into contact with the grip roller 111*a*, the printing paper caught between the pressurizing roller 11*b* and the grip roller 111*a* can be transferred.

However, if the grip roller 111*a* and the pressurizing roller 111*b* perform the same or similar function as or to each other, like a capstan roller and an idle roller as a pair of rollers, other rollers replaceable therewith may be adopted.

The feed roll 120 provides the roll type ink ribbon. The feed roll 120 is provided as one pair, together with the winding roll 130 as will be discussed later, and the feed roll 120 is rotatably coupled to the ribbon cartridge, while being disposed parallel to the winding roll 130.

The winding roll 130 serves to wind and collect the ink ribbon used for printing, and as the ink ribbon as a consumable passes through the thermal print head 140, the ink ribbon from which ink such as dye or pigment is transferred (consumed) to the printing paper is wound on the winding roll 130.

The ribbon feed path PT-R is a path along which the ink ribbon unwound from the feed roll 120 moves to the winding roll 130, and to prevent the interference with the thermal print head 140 and other parts from occurring, guides with wall structures are formed on at least a given area of the ribbon feed path PT-R.

As the ribbon feed path PT-R allows the ink ribbon unwound from the feed roll 120 to pass through the thermal print head 140, it corresponds to a given area of the paper feed path PT-P. That is, the ribbon feed path PT-R on the area coming into close contact with the thermal print head 140 corresponds to the paper feed path PT-P.

According to an embodiment of the present invention, if the feed roll 120 is located on an upper portion of the printer housing 10 and the winding roll 130 is spaced apart from the feed roll 120 below the feed roll 120, the ink ribbon unwound from the feed roll 120 in a clockwise direction passes through the thermal print head 140, and next, the ink ribbon is wound on the winding roll 130 in the clockwise direction. Accordingly, while tension is being applied in the form of 'S', the ink ribbon is fed.

The thermal print head 140 serves to apply heat to the ink ribbon to print the printing paper and typically has the shape of a module. The thermal print head 140 applies heat to the ink ribbon and thus allows the dye or pigment accommodated into the ink ribbon to be transferred to the printing paper.

To do this, the thermal print head 140 is located at a specific point where the paper feed path PT-P and the ribbon feed path PT-R correspond to each other. That is, in a state where the ink ribbon is overlaid on top of the printing paper, the ink ribbon comes into contact with the thermal print head 140.

The platen roller 150 serves to allow the printing paper and the ink ribbon to come into close with the thermal print head 140 during the printing, and according to an embodiment of the present invention, as the platen roller 150 moves toward the thermal print head 140 or is distant therefrom through cam structures, the printing paper and the ink ribbon come into close with the thermal print head 140 only during the printing.

To allow the ink accommodated in the ink ribbon to be transferred to the printing paper to print the printing paper, the printing paper is located on the platen roller 150, and the ink ribbon on the thermal print head 140, so that as the platen roller 150 moves toward the thermal print head 140, the printing is performed.

The diverter 160 is located at the branch point located under the thermal print head 140 with respect to the transfer direction of the printing paper. That is, the diverter 160 is located at a given position after the printing paper has passed through the thermal print head 140 and thus selects a subsequent printing process.

The diverter 160 has a predetermined width corresponding to a width of the printing paper to guide the printing paper to any one of the paper escape path P-RE and the paper exit path P-EX according to its rotational directions, and the diverter 160 has a rotating center shaft located on top thereof.

Further, the diverter 160 is connected to a coil spring (not shown) on one side end portion thereof in a transverse direction thereof to apply an elastic force in a direction perpendicular thereto (in left and right directions of the drawing), and the diverter 160 is pushed or released from the pushed state by means of cams.

The diverter 160 rotates within a given range around the rotating center shaft thereof, so that if the diverter 160 rotates to one side (for example, to the right side of the drawing) and thus opens the first branch path (closes the second branch path), the printing paper is transferred toward the paper escape path P-RE connected to the first branch path.

Contrarily, if the diverter 160 rotates to the other side (for example, to the left side of the drawing) and thus opens the second branch path (closes the first branch path), the printing paper introduced through a common input end of the branch paths is transferred toward the paper exit path P-EX connected to the second branch path.

In this case, the paper escape path P-RE serves to print various colors of ink on the printing paper sequentially, and whenever the respective colors are printed, the printing paper goes in and out of the paper escape path P-RE. As a result, the printing paper moves forward and backward.

As known, different colors (C, M, Y, and K) of ink is accommodated in a longitudinal direction of the ink ribbon, and the ink with the available colors is accommodated repeatedly in a given unit into the ink ribbon in the longitudinal direction of the ink ribbon.

After the ink on a specific color area of the ink ribbon is transferred to the printing paper, the ink ribbon moves by a given length, and then, the printing paper moves to the paper escape path P-RE so that the corresponding color is printed on the entire printing area thereof. Next, the above-mentioned processes are repeatedly performed to print other colors on the printing paper.

Contrarily, the paper exit path P-EX includes an area where the de-curling is performed after the printing has been done. As the cutter 180 and an exit hole 181 are provided sequentially on the paper exit path P-EX, further, de-curling, cutting, and discharging of the printing paper are performed along one path, thereby removing back-feeding.

According to the present invention, however, it is desirable that before the de-curling of the printing paper is performed through the de-curler 170 disposed below the diverter 160, additional de-curling be performed on an installation area of the diverter 160. If weak de-curling is first performed on the diverter 160, the de-curling result through the subsequent de-curler 170 is upgraded.

To do this, the diverter 160 is kept at a slant posture to a given angle if it rotates in a direction blocking the paper escape path P-RE, so that the diverter 160 provides a moving path bent in the opposite direction to the curled direction of the printing paper.

For example, if it is desired that the diverter 160 rotates to the left side to open the right side branch path, it rotates more to the left side with respect to a vertical line in such a way as to be kept to the slant posture. Accordingly, the printing paper is transferred, while being bent to the right side, so that weak de-curling is performed.

Furthermore, on a given area including an area before the printing paper passes through the diverter 160 and an area after the printing paper has passed through the diverter 160, desirably, a sub de-curler 161 (See FIG. 3) is located to provide a path along which the printing paper is bent in the opposite direction to the curled direction thereof.

If the sub de-curler 161 is further provided, it enhances the de-curling result, together with the diverter 160. The sub de-curler 161 is formed of a guide with a wall structure. According to an embodiment of the present invention, a wall serving as an inner partition wall of the feed roll 120 is bent so that the bent wall is provided as the sub de-curler 161.

MODE FOR INVENTION

Further, the de-curler 170 serves to provide an evenly unrolled printed material through the de-curling allowing the printing paper wound on the paper cartridge 110 to be bent in the opposite direction to the curled direction thereof, and the de-curler 170 is located on at least a given area of the paper exit path P-EX.

Figure 3:
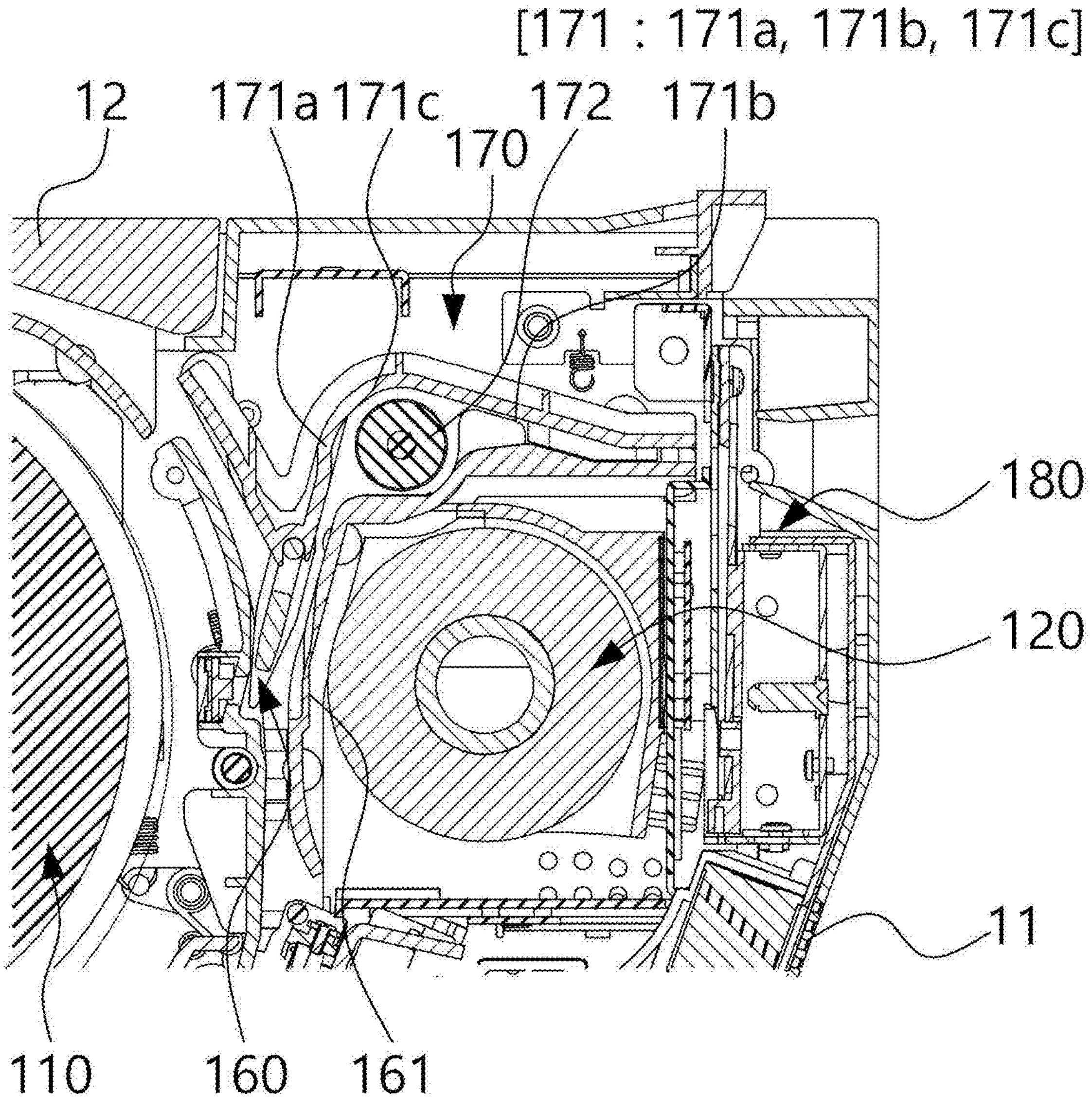
FIG. 3 is a partly enlarged view showing a de-curler of the thermal transfer printer according to the present invention.

As shown in FIG. 3, the de-curler 170 includes a de-curling guide 171 for providing a path bent to the opposite direction to the curled direction of the printing paper along the transfer direction of the printing paper and a de-curling roller 172 located in a space formed inside the de-curling guide 171.

According to an embodiment of the present invention, the de-curling guide 171 includes an entry portion 171*a* where the printing paper passes through the diverter 160 and thus enters the de-curler 170, an exit portion 171*b* where the printing paper is discharged toward the exit hole 181, and a de-curling portion 171*c* formed between the entry portion 171*a* and the exit portion 171*b* in such a way as to be bent to the opposite direction to the curled direction of the printing paper.

Figure 4:
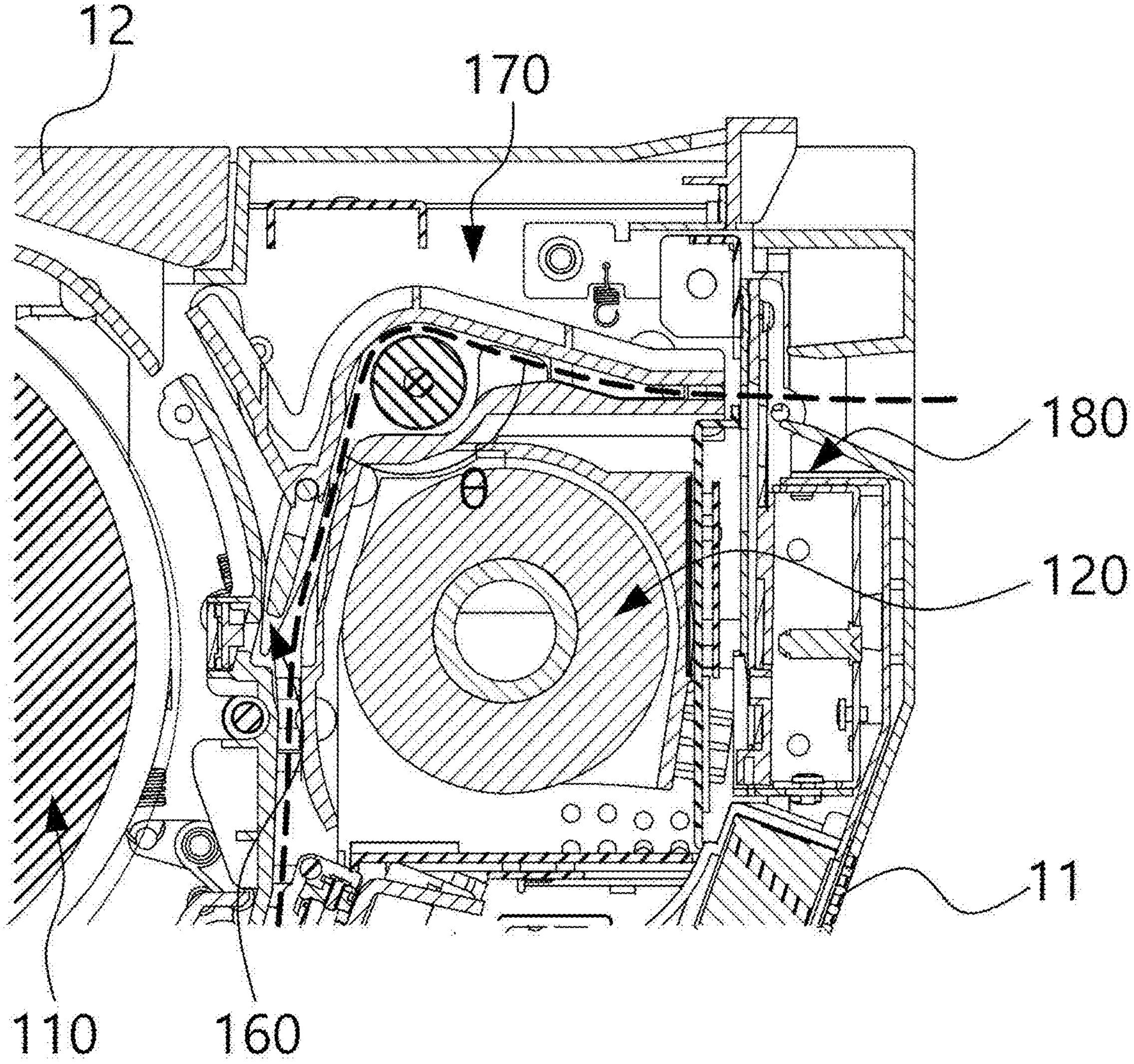
FIG. 4 is a partly enlarged view showing a de-curling angle of the thermal transfer printer according to the present invention.

In this case, as shown in FIG. 4, an internal angle θ between a first tangent line coming into contact with the entry portion 171*a* and a second tangent line coming into contact with the exit portion 171*b* is desirably at an angle of 85 to 95°. The internal angle θ between the entry portion 171*a* and the exit portion 171*b* represents a bent angle of the de-curling portion 171*c*, and through the corresponding angle, a sufficient de-curling result is obtained with just one transfer of the printing paper.

Further, the de-curling roll 172 is rotatably mounted in the printer housing 10 and is spaced apart from the inner wall of the de-curling guide 171, so that a path is formed between the de-curling roll 172 and the de-curling guide 171.

Therefore, the printing paper, which is supported against the de-curling guide 171 while being transferred, is transferred in the de-curling direction and thus evenly unrolled, and simultaneously, the de-curling roll 172 pressurizes the printing paper in the de-curling direction and stably transfers the printing paper.

After the de-curling has been completed, the printing paper is cut and discharged, without having any back-feeding. To do this, the cutter 180 is located between the de-curler 170 and the exit hole 181 to cut the printing paper to a predetermined length.

The cutter 180 has a cutting blade moving up and down or moving horizontally in a transverse direction of the printing paper, and the printing paper discharged from the de-curler 170 passes through a gap that is narrow in upward and downward directions and is thus inserted to the form of a straight line into the cutter 180.

A cut length corresponds to a length of unit paper. For example, the cutting is made to the length of a photo. To perform the cutting, a sensor is mounted on the exit hole 181 to check whether the printing paper is discharged by a predetermined length, and after the checking has been completed, the printing paper is cut.

The printing paper whose cutting is done after the printing has been completed is discharged to the outside of the printer housing 10 through the exit hole 181, and the discharged printing paper as a printed material where content selected by the user is printed is provided to the user.

According to the present invention, therefore, after the de-curling for the printing paper has been completed through the de-curler 170, the printing paper is directly discharged through the exit hole 181, without having any back-feeding through which the printing paper passes through the diverter 160 and is changed to the other path.

INDUSTRIAL APPLICABILITY

According to the present invention, the thermal transfer printer with the de-curling function performs the de-curling for the printing paper whose printing has been done and then directly provides the printing paper as the printed material to the user, without having any back-feeding.

The invention claimed is:

1. A thermal transfer printer with a de-curling function, comprising:

- a paper cartridge for providing a printing paper;
- a paper feed path (PT-P) for providing a path along which the printing paper unwound from the paper cartridge moves during a printing operation;
- a feed roll for providing a ink ribbon;
- a winding roll for winding and collecting the ink ribbon used for printing;
- a ribbon feed path (PT-R) for providing a path along which the ink ribbon unwound from the feed roll moves to the winding roll, the ribbon feed path (PT-R) corresponding to a portion of the paper feed path (PT-P);

a thermal print head located at a specific point where the paper feed path (PT-P) and the ribbon feed path (PT-R) correspond to each other and adapted to apply heat to the ink ribbon to print the printing paper;

a platen roller adapted to allow the printing paper and the ink ribbon to come into contact with the thermal print head during the printing;

a diverter located at a branch point located under the thermal print head with respect to a transfer direction of the printing paper and adapted to guide the printing paper to one of a paper escape path (P-RE) and a paper exit path (P-EX) according to a rotational direction thereof;

a de-curler located on at least a portion of the paper exit path (P-EX) and adapted to perform de-curling through which the printing paper is bent in a direction opposite to a curled direction thereof; and a cutter located between the de-curler and an exit hole for discharging the printing paper whose printing has been completed to the outside of the printer and adapted to cut the printing paper to a predetermined length, wherein the diverter is kept in a slant posture at a predetermined angle when the diverter rotates in a direction blocking the paper escape path (P-RE), so that the diverter provides a moving path bent in the direction opposite to the curled direction of the printing paper, wherein, in a region including an area before the printing paper passes through the diverter and an area after the printing paper has passed through the diverter, a sub de-curler is located and provides a path along which the printing paper is bent in the direction opposite to the curled direction thereof, and wherein after the de-curling for the printing paper has been completed through the de-curler, the printing paper continues to move along the paper exit path (P-EX) and is directly discharged through the exit hole.

2. The thermal transfer printer according to claim 1, wherein the paper cartridge is located on one side of a printer housing in a transverse direction of the printer housing, the feed roll and the winding roll are located on the upper and lower portions of another side of the printer housing in the transverse direction of the printer housing, the thermal print head is placed between the feed roll and the winding roll, the paper escape path (P-RE) is located above the paper cartridge, the paper exit path (P-EX) is located above the feed roll, and the branch paths of the paper escape path (P-RE) and the paper exit path (P-EX) are formed above the diverter.

3. The thermal transfer printer according to claim 1, wherein the de-curler comprises:

a de-curling guide for providing a path bent in the direction opposite to the curled direction of the printing paper along the transfer direction of the printing paper; and a de-curling roller located in a space formed inside the de-curling guide, while being spaced apart from an inner wall of the de-curling guide, so that a path is formed between the de-curling roller and the de-curling guide.

4. The thermal transfer printer according to claim 3, wherein the de-curling guide comprises:

an entry portion where the printing paper passes through the diverter and thus enters the de-curler;

an exit portion where the printing paper is discharged toward the exit hole; and a de-curling portion formed between the entry portion and the exit portion in such a way as to be bent in the direction opposite to the curled direction of the printing paper.

5. The thermal transfer printer according to claim 4, wherein an internal angle (θ) between a first tangent line coming into contact with the entry portion and a second tangent line coming into contact with the exit portion is in a range of 85 to 95°.

* * * * *